April 23, 1940.  M. TANZI  2,197,988

DIE FOR FORMING PLASTIC MATERIALS INTO THREADS OR RIBBONS

Filed March 3, 1939  2 Sheets-Sheet 1

Inventor:
Mario Tanzi
By C P Soper
Atty.

April 23, 1940.  M. TANZI  2,197,988
DIE FOR FORMING PLASTIC MATERIALS INTO THREADS OR RIBBONS
Filed March 3, 1939  2 Sheets-Sheet 2
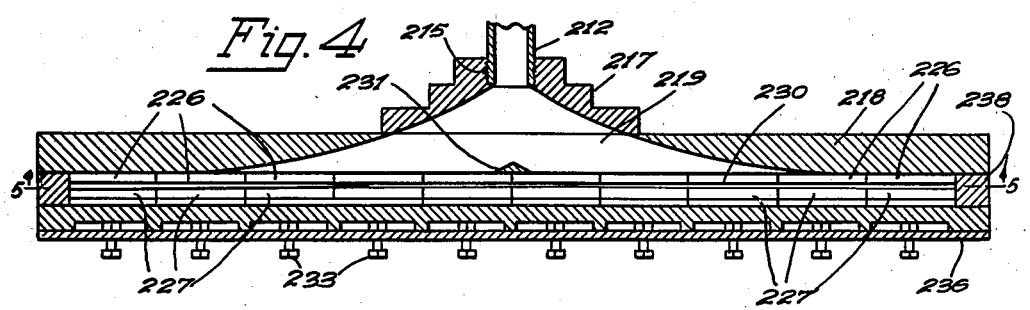
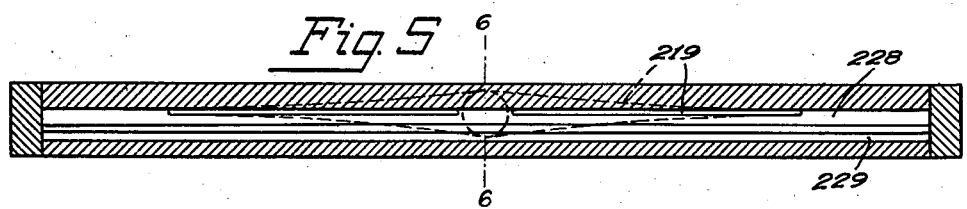
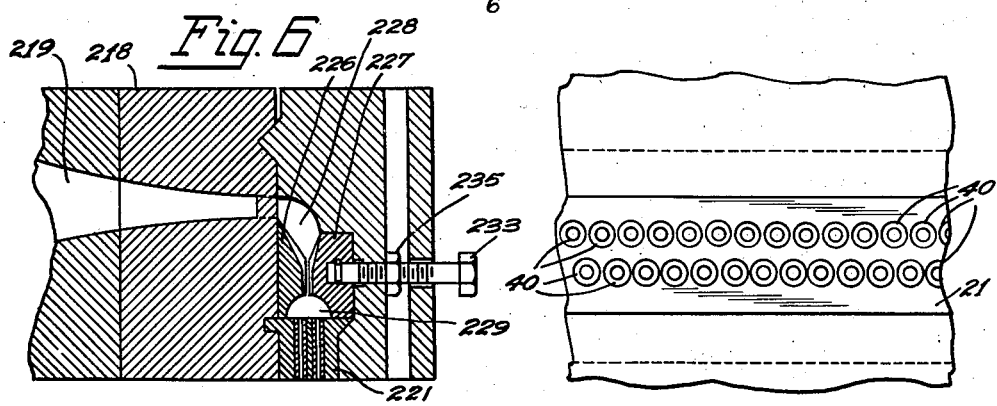
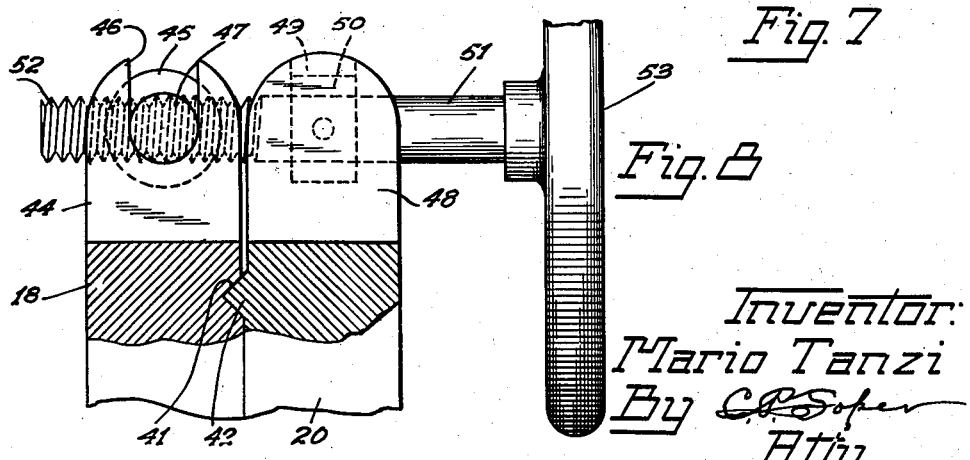
Inventor:
Mario Tanzi
By C. P. Soper
Atty.

Patented Apr. 23, 1940

2,197,988

UNITED STATES PATENT OFFICE 2,197,988

DIE FOR FORMING PLASTIC MATERIALS INTO THREADS OR RIBBONS

Mario Tanzi, Chicago, Ill., assignor to The John B. Canepa Company, Chicago, Ill.

Application March 3, 1939, Serial No. 259,579

18 Claims. (Cl. 107—14)

My invention relates to improvements in dies and associated parts used in the manufacture of spaghetti and similar paste products.

It has been found that the manufacture of macaroni and other alimentary paste products can be carried on most expeditiously if the strands or threads are extruded from a horizontally extending die in such a manner that they will hang downwardly in close formation so as to form a substantially continuous sheet. The die employed will necessarily be of a length much greater than the diameter of the pressure chamber from which the dough is forced through the forming die. It also is very desirable that the threads or strands issue from the die at substantially uniform speed throughout its length.

A horizontally extending channel which communicates with the pressure chamber is provided in order to supply the dough to the end portions of the die. As the dough or mix used in making macaroni and the like is comparatively dry and therefore of relatively thick or heavy consistency, it offers considerable resistance to travel along the horizontal channel and thus, in order that the dough be fed to the die at a substantially uniform pressure throughout its length, it is necessary that the flow of the dough from said channel to a passage over the die be retarded at points adjacent to the pressure chamber to a greater extent than at points remote from the pressure chamber.

One of the objects of the invention is the provision of spreading means located between the pressure chamber and the die whereby the dough is caused to be fed to the die at substantially uniform pressure throughout its length.

A feature of the invention resides in the provision of a laterally extending channel or passage which freely communicates with the pressure chamber and a second laterally extending channel which communicates with the bores or holes through the die, a baffle being positioned between the two channels and arranged to form a distributor or spreader which offers a resistance to the passage of the dough from the first channel to the second which gradually increases from the ends of the channels to the point where the first channel communicates with the pressure chamber. The baffle and spreader will preferably comprise a pair of plates, adjacent edges of which will be spaced apart to provide a slot therebetween through which the dough is adapted to pass from the first channel to the second. The slot thus provided will be of varying width, being narrowest adjacent to the pressure chamber and gradually increasing in width towards the ends of the channels. As a modification, the slot may be of substantially uniform width throughout its length, but of varying depth. In this case the depth of the slot will be relatively slight adjacent to the ends and will gradually increase toward the pressure chamber.

A further feature consists of forming one side wall of the slot in sections and providing means whereby the several sections may be separately adjusted toward or from the opposing wall of the slot. By this means, if it is found that the dough is being fed to a portion of the die, either too slowly or too fast, the adjustable section or sections of the slot wall overlying this section of the die can be readily adjusted toward or from the other wall so as to secure uniform feed of the dough to the die throughout its length.

In the operation of the device, the dough is forced through the passages and the die openings under comparatively high pressure. As the dough firmly adheres to the walls of the passages and die a short time after a run is stopped, it is desirable to provide means permitting the ready cleaning of the passages and die.

Another feature of the invention relates to the provision of means such that the parts forming the distributor or spreading means may be quickly and easily separated and the die removed therefrom to permit easy inspection and cleaning.

Other features and advantages will appear as the description progresses.

It is believed that the structure and operation of the invention will be understood most easily from a detailed description thereof taken in connection with the accompanying drawings in which Fig. 1 is a top plan view schematically indicating the pressure chamber and a pair of die structures associated therewith, one of the die structures being shown in horizontal cross-section to better show certain of the parts;

Fig. 4 is a view similar to the lower part of Fig. 1, but shows the form of spreader in which the slot increases in width towards the ends of the die;

Fig. 5 is a section on the line 5—5 of Fig. 4, looking in the direction of the arrows;

Fig. 6 is a view similar to Fig. 3, but taken on the line 6—6 of Fig. 5;

Fig. 7 is a plan view of the die showing the arrangement of the bores or holes therethrough, and Fig. 8 is an end view of one of the die structures showing the clamping means which firmly holds the parts of the die frame together, but permits the quick and easy separation thereof.

Figure 1:
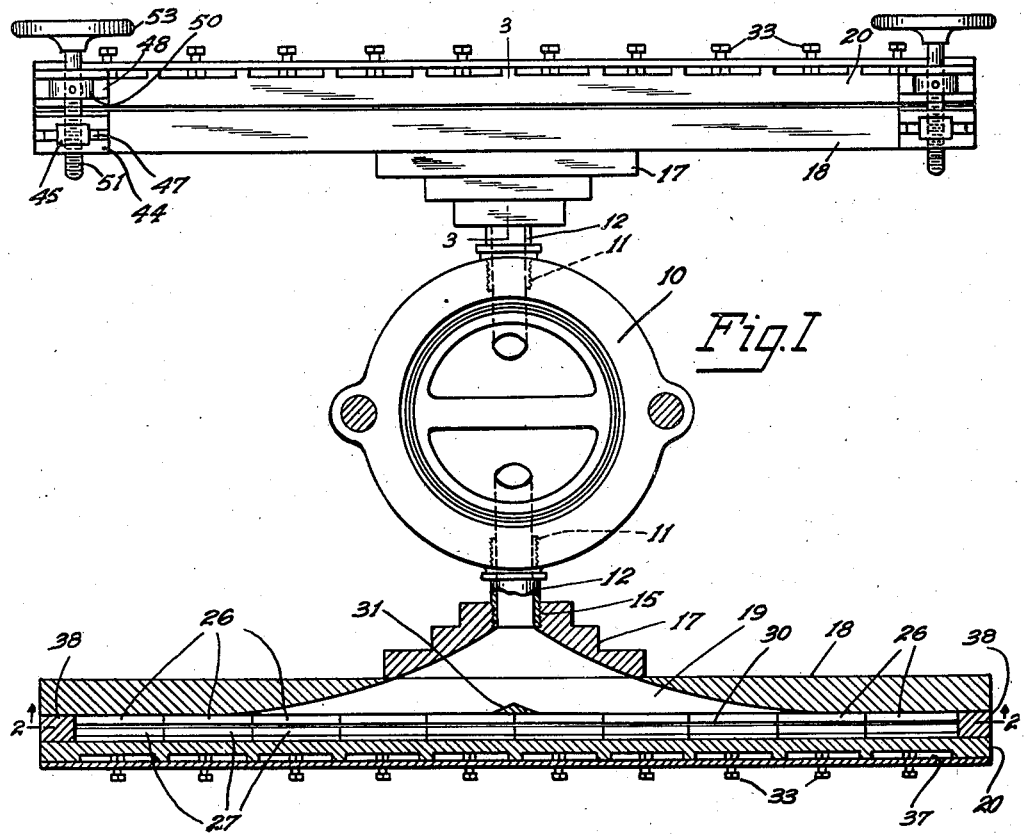
Figure 3:
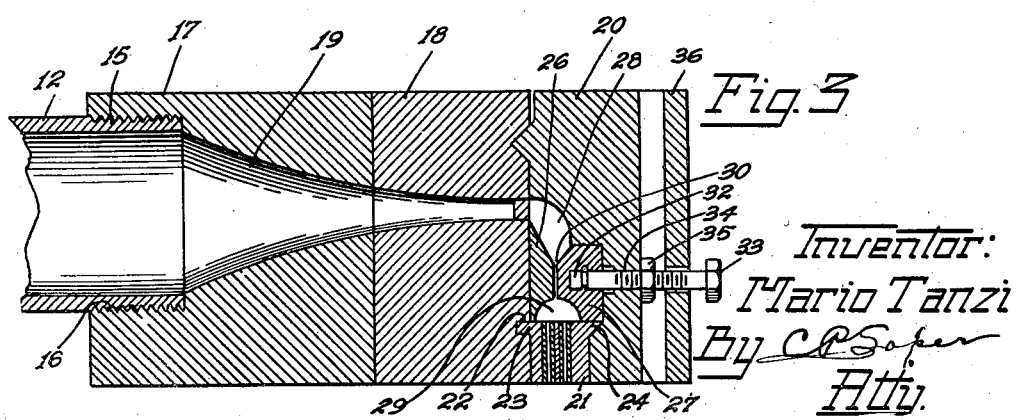
Fig. 3 is a section on the line 3—3 of Fig. 1 which shows how the pressure chamber communicates with the die structure.

Referring now to the drawings in which like reference characters indicate the same parts in the different views, 10 indicates a pressure chamber which so far as the pressure producing means is concerned, may be of any desired character, such as the piston and screw propelling means commonly employed. The opposite walls of the pressure chamber 10, adjacent to the end thereof, are provided with the threaded openings 11 which receive, respectively, the threaded portions of the pipes or tubes 12. The pipes 12 terminate well within the cylinder 10 so as to receive the dough under pressure therein. The outer ends of pipes 12 are screw threaded as shown at 15 in Figs. 1 and 3. The screw threaded ends 15 are received in the threaded openings 16 in the hub 17 which may be fixed to or formed integral with the bar or block 18. Within each hub 17 and bar 18 and communicating with the opening 16 and pipe 12 therein, is a recess 19, which broadens laterally and inwardly from the openings 16, as shown in Fig. 1, but contracts vertically and inwardly, as seen in Fig. 3. Secured to the block or bar 18, in a manner which will presently be described, is a block or bar 20 (Fig. 3). The die 21 is positioned in a recess formed adjacent to the lower edges of the blocks 18 and 20. Block 18 is provided with the laterally extending groove 22 which receives the similarly shaped rib 23 at the top edge of die 21. The opposite upper edge of the die 21 is flared outwardly, as shown at 24 in Fig. 3. The rib 23 and flared portion 24 on die 21 assist in accurately positioning the die when the blocks 18 and 20 are placed in engagement, as well as prevent downward movement of the die relative to the supporting blocks.

Formed in block 20, above the die 21, is a recess within which are mounted the baffle members 26 and 27. Both the baffle members are preferably formed of relatively short sections, as clearly indicated in Fig. 1.

Above the baffles 26 and 27 is a channel 28 and below the said baffles, but above die 21, is a second channel 29. By reference to Fig. 3, it will be seen that the baffles 26 and 27 are spaced apart to leave a slot 30 therebetween.

Figure 2:
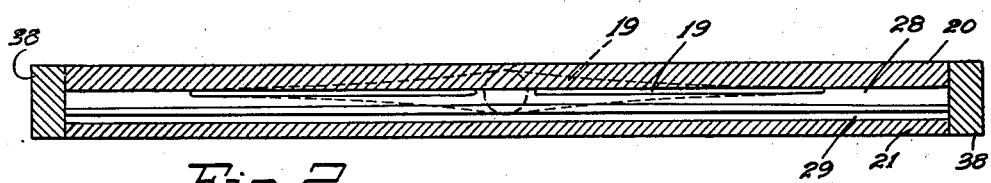
Fig. 2 is a section substantially on the line 2—2 of Fig. 1, looking in the direction of the arrows.

Before further describing the details of applicant's structure, a general description of its operation will be given. The die of the device herein disclosed is much greater in length than the diameter of cylinder 10. It, therefore, is necessary to provide means to distribute the dough forced from cylinder 10 so as to be delivered to the die substantially equally throughout its length. Thus, the mix issuing from a pipe 12 passes outwardly through the laterally flared recess 19 in hub 17 and block 18 and tends to spread and flow toward the ends of the die. If desired, the block 18 may be provided, opposite the pipe 12, with a generally triangular abutment 31 which will tend to split the stream of dough and deflect a part of it in each direction. From the recess 19, the dough enters the upper channel 28 in block 20. In order to pass from channel 28 to channel 29 and thence to die 21, the dough must pass through the comparatively narrow slot 30. The opposing walls of baffle sections 26 and 27 are of greater vertical area at the point where the dough has comparatively free access to channel 28 than adjacent to the ends thereof, as shown in Fig. 2.

It has been found that a slot of considerable vertical area offers a much greater resistance to the passage of the dough therethrough than it does adjacent to the ends where the slot is shallower. It will now be evident that the passage of the dough from channel 28 to channel 29 is resisted to a much greater extent centrally thereof than at points adjacent to the ends. Thus, by a proper proportioning of channel 28 and the vertical dimensions of the different sections of the slot 30, the dough may be caused to flow, under pressure, to the ends of the channel 28 and through the slot 30 to the channel 29 and die 21 at substantially the same speed and pressure as prevails centrally thereof.

In order to closely regulate the flow of dough to the lower channel 29, means are provided to separately adjust the baffle sections 27 to or from the opposed sections 26. This adjusting means is shown particularly in Figs. 1 and 3 of the drawings. Rotatably fixed in each of the baffle sections 27 is one end 32 of a screw threaded member 33 which is threaded through an opening 34 in the block 20. It will thus be evident that by turning a threaded member 33, the corresponding baffle section may be easily adjusted with precision toward or from section 26. Thus, the flow of dough through slot 30 can be accurately controlled throughout the length of the slot. Lock nuts 35 may be provided to maintain the threaded members 33 in adjusted position. Secured to the block 20, in any desired manner, is a bar 36, provided with openings 37 through which the screws 33 extend. The bar 36 serves to protect the lock nuts 35 and screws 33 and tends to prevent accidental displacement of baffle sections 27. The ends of channels 28 and 29 and slot 30 are capped by blocks 38 held in position in any desired manner.

The structure shown in Figs. 4, 5 and 6 is similar to that of Fig. 1, but differs from the structure just described solely in the character of the spreader slot provided between the baffle sections. In view of the fact that the structures are, for the most part, the same, the parts in Figs. 4, 5 and 6 will be designated by the same reference characters as like parts in Figs. 1, 2 and 3, but preceded in each case by the digit 2. Thus, the block 18 of Fig. 1 becomes block 218 in Fig. 4. Due to the general similarity in the two forms of the invention, it is believed unnecessary to describe the structure of Figs. 4, 5 and 6, other than to explain how it differs from the form shown in Figs. 1, 2 and 3.

It will be recalled that the slot 30 of the structure, first described, is of substantially uniform width throughout its length but the depth of the slot, between the opposed surfaces of the baffles, decreases from a point generally centrally thereof toward the ends.

In Figs. 4, 5 and 6, the opposing walls of the baffles 226 and 227, between which the slot 230 is formed, are of substantially uniform depth throughout, but the slot 230 is narrowed centrally thereof, adjacent to the exit from the pressure chamber but is gradually widened toward the ends of the die, thus effecting substantially the same result as the structure of Fig. 1.

It is evident that the two expedients employed may be combined in one structure if desired. For instance, if we assume a structure, such as shown in Fig. 1, having the slot 30 of substantially uniform width, if it is found that the paste is passing to the die too rapidly centrally thereof, the slot may be narrowed by the baffle adjusting means centrally so as to offer greater resistance to the passage of the paste or dough therethrough.

In Fig. 7, the arrangement of the holes or bores 40 in the die 21 is shown. It will be noted that two rows of the holes 40 are provided closely adjacent to each other. It will also be noted that the holes of one row or series are staggered or alternate with those of the other. Thus, when the threads of spaghetti or macaroni issuing from the holes 40 are folded over the supporting rod, the threads lie close together so as to form a practically continuous surface.

The means for detachably securing blocks 18 and 20 together will now be described. Block 18 is provided in the face thereof with a generally triangular groove 41 arranged to receive a similarly shaped rib 42 which projects from the adjacent face of block 20. This groove and rib act to definitely position the blocks relative to each other when they are forced into intimate contact by the clamping means, shown particularly in Fig. 8.

The block 18 is provided on its upper edge with the upwardly extending projecting portions 44. Each portion 44 is recessed to receive a threaded device 45, as shown in Fig. 1. Part 44 is also provided at each side with a notch or slot 46 which forms bearings for the trunnions 47 fixed with the threaded part 45.

The block 20 is provided with humps or projections 48 which are positioned opposite the projecting portions 44. Each of the humps 48, at the top thereof, has a recess, shown at 49, adapted to receive a collar 50 on the screw member 51. The threaded portions 52 of the screws 51 are received by the threaded blocks or nuts 45. A hand wheel 53 is provided at the end of each screw 51 by means of which the screw may be rotated.

With the blocks 18 and 20 in intimate contact, as shown in Fig. 8, if it is desired to separate the blocks for the purpose of cleaning the internal channels or to remove the die 21, the screws 51 will be rotated in an anticlockwise direction by means of the hand wheels 51, until rib 42 has been moved out of groove 41, whereupon block 20 and screws 51 may be rotated upwardly about trunnions 47 until the desired parts are made accessible.

When it is desired to return block 20 to operative position, it will be rotated downwardly until rib 42 is positioned opposite groove 41. If, now, screws 51 be rotated in a clockwise direction, rib 42 will be forced into groove 41 and when the blocks have been drawn into firm contact, they will be so held ready for operation.

It is to be understood that the invention is in no way limited to the use of the pressure chamber disclosed, nor to the use of two die structures, such as illustrated in Fig. 1. It, also, is obvious that the die or dies may be located below the pressure chamber, instead of at the side thereof, in which case the dough would flow to the upper channel of the spreader in a downward direction instead of laterally.

While in the drawings and the above description certain preferred embodiments of the invention are disclosed, many other modifications thereof may be made without departing from the spirit of the invention. The invention should, therefore, be limited only by the scope of the appended claims.

Having thus described my invention, what I claim as new and desire to secure by Letters Patent of the United States is:

1. In a device of the character described, a pressure chamber, an elongated die, a channel adjacent to said die, a passage joining said pressure chamber to said channel, and a baffle between said channel and said die, said baffle being provided with a slot joining said channel to said die, said slot being of varying cross sectional area.

2. In a device of the character described, a pressure chamber, an elongated die, a channel adjacent to said die, a generally V-shaped passage joining said pressure chamber to said channel, and a baffle between said channel and said die, said baffle being provided with a slot joining said channel to said die, said slot being of less cross sectional area at points remote from said pressure chamber than it is adjacent thereto.

3. In a device of the character described, a pressure chamber, an elongated die, a channel adjacent to said die, a passage joining said pressure chamber to said channel, and a baffle between said channel and said die, said baffle being provided with a slot joining said channel to said die and extending substantially to the ends thereof.

4. In a device of the character described, a pressure chamber, an elongated die, a channel adjacent to said die, a passage joining said pressure chamber to said channel, and a baffle between said channel and said die, said baffle being provided with a slot joining said channel to said die, said slot gradually increasing in conductivity from a point opposite said passage to points adjacent to the ends of said die.

5. In a device of the character described, a pressure chamber, an elongated die, a channel adjacent to said die, a passage joining said pressure chamber to said channel, and a baffle between said channel and said die, said baffle being provided with a slot joining said channel to said die, said slot gradually decreasing in cross section from a point opposite said passage to points adjacent to the ends of said die.

6. In a device of the character described, a pressure chamber, an elongated die, a channel adjacent to said die, a generally V-shaped passage joining said pressure chamber to said channel, and a baffle between said channel and said die, said baffle being provided with a slot joining said channel to said die, said slot gradually decreasing in cross section from a point opposite said passage to points adjacent to the ends of said die.

7. In a device of the character described, a pressure chamber, a die support, an elongated die carried thereby, a channel in said support adjacent to said die, a passage joining said pressure chamber to said channel, a baffle between said channel and said die, said baffle being provided with a slot joining said channel to said die and means, operable from the exterior of said die support, for varying the width of said slot.

8. In a device of the character described, a pressure chamber, a die support, an elongated die carried thereby, a channel in said support adjacent to said die, a passage joining said pressure chamber to said channel, a baffle between said channel and said die, said baffle being provided with a slot of varying cross section joining said channel to said die and means, operable from the exterior of said die support, for varying the width of said slot.

9. In a device of the character described, a pressure chamber, a die support, an elongated die carried thereby, a channel in said support adjacent to said die, a generally V-shaped passage joining said pressure chamber to said channel, a baffle between said channel and said die, said baffle being provided with a slot joining said channel to said die, said slot varying in cross section from a point opposite said passage to points adjacent to the ends of said die and means, operable from the exterior of said die support, for varying the width of said slot.

10. In a device of the character described, a laterally extending die support having a channel formed therein, a die carried by said support, a second channel in said support overlying said die and freely communicating therewith, and opposed baffles positioned between said channels arranged to provide a slot therebetween, extending approximately to the ends of the die, said slot being wider adjacent to its ends than at points remote therefrom.

11. In a device of the character described, a laterally extending die support having a channel formed therein, a die carried by said support, a second channel in said support overlying said die and freely communicating therewith, opposed baffles positioned between said channels arranged to provide a slot therebetween, and means for adjusting one of said baffles to or from the opposed baffle.

12. In a device of the character described, a laterally extending die support having a channel formed therein, a die carried by said support, a second channel in said support overlying said die and freely communicating therewith, opposed baffles positioned between said channels arranged to provide a slot therebetween, one of said baffles comprising a series of sections and means for separately adjusting said sections to or from the opposed baffle.

13. In a device of the class described, a pressure chamber, an elongated die support having a channel therein, said channel being arranged to communicate with the interior of said pressure chamber, an elongated die carried by said support, said support being provided with a second channel adjacent to said die and freely communicating therewith, a pair of baffle members positioned between said channels, said baffle members being arranged to provide a slot therebetween, characterized in this that the slot gradually tapers from a point adjacent to said pressure chamber to the ends of said channels whereby passage from the first-mentioned channel to the second channel is retarded to a greater degree adjacent to the pressure chamber than at the ends of the channels.

14. In a device of the class described, a pressure chamber, a laterally extending die support having an elongated horizontally extending channel therein, said channel being arranged to communicate with the interior of said pressure chamber, a laterally extending die carried by said support, said support being provided with a second channel overlying said die and freely communicating therewith, and a pair of baffle members positioned between said channels, said baffle members being positioned to provide a slot therebetween, characterized in this that the slot gradually tapers from a point adjacent to said pressure chamber to the ends of said channels whereby passage from the first mentioned channel to the second channel is retarded to a greater degree adjacent to the pressure chamber than at the ends of the channels.

15. In a device of the class described, a pressure chamber, a laterally extending die support having an elongated horizontally extending channel therein, said channel being arranged to communicate with the interior of said pressure chamber, a laterally extending die carried by said support, said support being provided with a second channel overlying said die and freely communicating therewith, a pair of baffle members positioned between said channels, said baffle members being positioned to provide a slot therebetween, characterized in this that the said slot gradually tapers from a point adjacent to said pressure chamber to the ends of said channels whereby passage from the first-mentioned channel to the second channel is retarded to a greater degree adjacent to the pressure chamber than at the ends of the channels, and means for differently adjusting the width of said slot throughout its length.

16. In a device of the class described, a macaroni die, a pair of blocks between which said die is supported, and clamping means for detachably securing said blocks together, said clamping means consisting of a threaded rod, a member in screw threaded engagement with the threads on said rod pivotly supported in one of said blocks and a collar on said rod, remote from said threaded member, mounted in the other block of said pair.

17. In a device of the class described, a macaroni die, a pair of blocks between which said die is supported, and clamping means for detachably securing said blocks together, said clamping means consisting of a threaded rod, a hand hold at one end of said rod, a member in screw threaded engagement with the threads on said rod pivotally supported in one of said blocks and a collar on said rod, remote from said threaded member, mounted in the other block of said pair, whereby said blocks may be forcibly separated or brought into firm engagement.

18. In a device of the class described, a macaroni die, a pair of blocks between which said die is supported, a projecting rib on one of said blocks, the other of said blocks being provided with a groove arranged to receive said rib whereby said blocks are positioned relative to each other, clamping means for detachably securing said blocks together, said clamping means consisting of a threaded rod, a hand hold at one end of said rod, a member in screw threaded engagement with the threads on said rod pivotally supported in one of said blocks and a collar on said rod, remote from said threaded member, mounted in the other block of said pair.

MARIO TANZI.